(12) United States Patent
Gonzales, Jr.

(10) Patent No.: US 9,984,261 B2
(45) Date of Patent: May 29, 2018

(54) WARP AND WEFT ENCODING OF GARMENT

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

(*) Notice: Subject to any disclaimer, the term of this patent is extended or adjusted under 35 U.S.C. 154(b) by 0 days. days.

(21) Appl. No.: 15/285,151

(22) Filed: Oct. 4, 2016

(65) Prior Publication Data
US 2018/0096178 A1 Apr. 5, 2018

(51) Int. Cl.
G06K 5/00 (2006.01)
G06K 7/10 (2006.01)
G06Q 30/00 (2012.01)

(52) U.S. Cl.
CPC ....... *G06K 7/10366* (2013.01); *G06Q 30/018* (2013.01)

(58) Field of Classification Search
CPC ............... G06K 7/10366; G06K 17/00; G06K 7/10693; G06K 7/12; G06K 19/14; G07F 7/1008; G06Q 20/341
USPC .................... 235/468, 380, 462.13
See application file for complete search history.

(56) References Cited

U.S. PATENT DOCUMENTS

| | | | |
|---|---|---|---|
| 3,634,827 A | 1/1972 | Lourie et al. | |
| 2003/0089782 A1* | 5/2003 | Reed ........................ | D06H 1/00 235/468 |
| 2003/0231785 A1 | 12/2003 | Rhoads et al. | |
| 2008/0009960 A1 | 1/2008 | Jinlian et al. | |
| 2008/0218310 A1 | 9/2008 | Alten et al. | |

FOREIGN PATENT DOCUMENTS

| | | |
|---|---|---|
| CN | 201413596 Y | 2/2010 |
| CN | 103176420 B | 6/2015 |

OTHER PUBLICATIONS

International Search Report received for PCT Application No. PCT/US2017/055102, dated Jan. 9, 2018, 3 pages.
Written Opinion received for PCT Application No. PCT/US2017/055102, dated Jan. 9, 2018, 5 pages.

* cited by examiner

*Primary Examiner* — Karl D Frech
(74) *Attorney, Agent, or Firm* — Schwegman Lundberg & Woessner, P.A.

(57) ABSTRACT

In various example embodiments, a system and method for authenticating a garment are presented. The authentication system can include a code reader configured to receive an image of a garment. An asymmetrical pattern can be woven in a section of the garment. The code reader can decode weft and warp information from weave lines in the asymmetrical pattern and determine a validation code based on the weft and warp information. Additionally, an authentication system can access, from an authentication database, authentication codes associated with authentic garments. The authentication system can calculate a confidence score based on a comparison of the validation code with one of the authentication codes. Subsequently, a publication system can cause a presentation, on a display of a device, a verification that the garment is authentic when the confidence score is above a predetermined threshold.

20 Claims, 7 Drawing Sheets

US 9,984,261 B2

WARP AND WEFT ENCODING OF GARMENT

TECHNICAL FIELD

Embodiments of the present disclosure relate generally to the technical field of data processing and specifically to using an authentication database to process a validation code in order to verify that a garment is authentic. More particularly, but not by way of limitation, techniques to determine the validation code by deciphering weft and warp information from an asymmetrical pattern in the garment are provided.

BACKGROUND

Conventionally, a publication can be listed on an online marketplace. In some instances, a publication can be an item listing in the online marketplace. The online marketplace can provide listing services for items to be purchased and sold. For example, a seller can list an item for sale on the marketplace. Additionally, a buyer can browse a website of the online marketplace and purchase an item.

The online marketplace can allow a seller to list an item by uploading images of the item on the online marketplace and inputting item attributes for the item. Problems may exist in the online marketplace with counterfeit items being listed by sellers.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
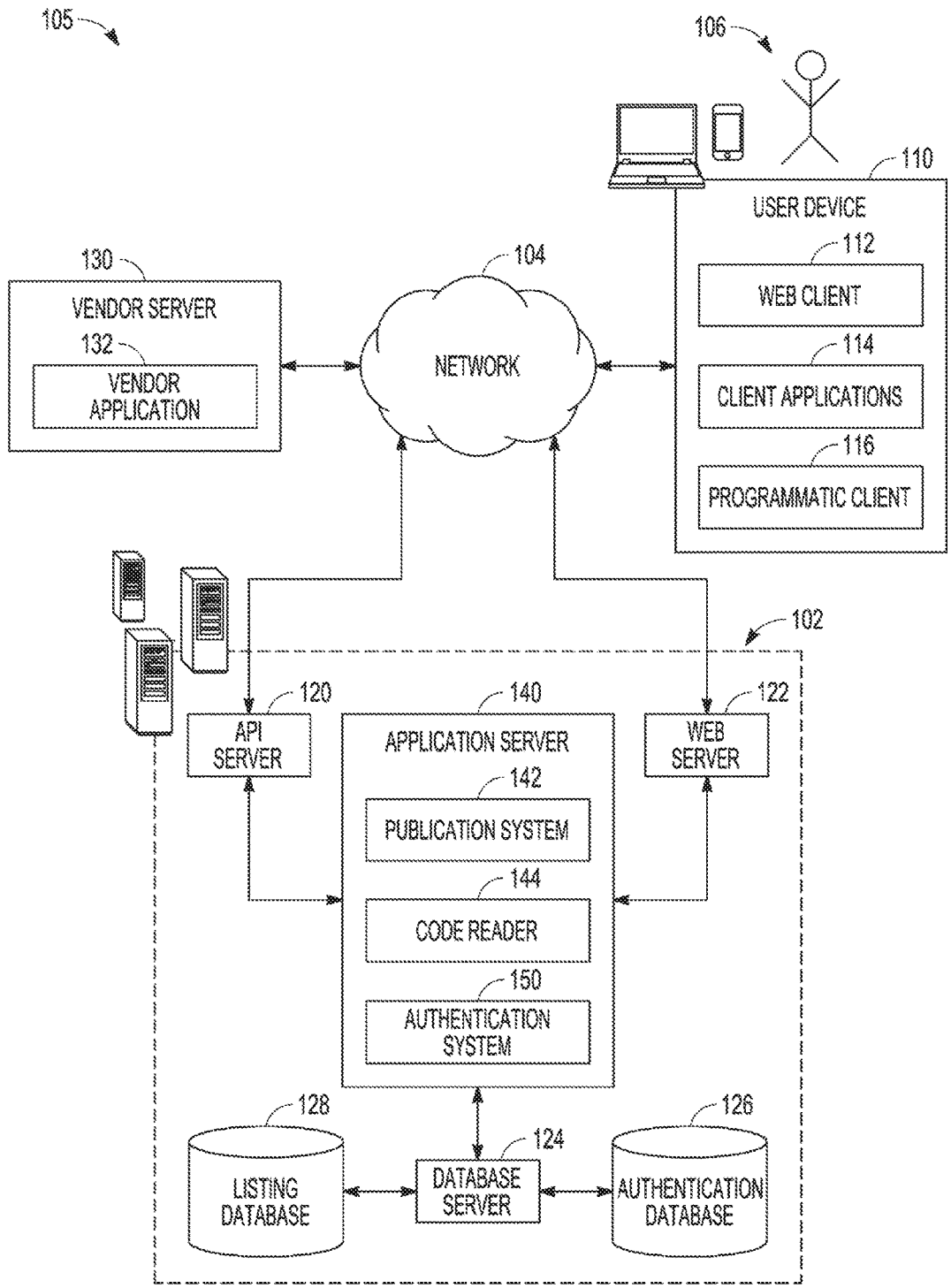
FIG. 1 is a block diagram illustrating a networked system, according to some example embodiments.

The description that follows includes systems, methods, techniques, instruction sequences, and computing machine program products that embody illustrative embodiments. In the following description, for the purposes of explanation, numerous specific details are set forth in order to provide an understanding of various embodiments of the subject matter discussed herein. It will be evident, however, to those skilled in the art, that embodiments of the inventive subject matter may be practiced without these specific details. In general, well-known instruction instances, protocols, structures, and techniques are not necessarily shown in detail.

A publication system includes publications that have been created by a user of the publication system. The user can publish content on the publication system. For example, a seller can list an item for sale in the publication system by generating an item listing. The item listing is an example of a publication. The seller can commence the selling experience in the online marketplace by listing items (e.g., garments) for sale. Additionally, the seller can upload an image of the item. The image of the item can include a validation code embedded in the item. For example, when the item is a garment, an asymmetrical pattern corresponding to the verification code can be woven in the garment. The authenticity of the item can be verified by the publication system using the verification code.

Once the item is listed, the item can be available for users to search and purchase from the online marketplace. A shopping experience for a buyer can be enhanced when the items listed for sale are verified by the publication system to be authentic. In a conventional publication system, a buyer may unknowingly buy a counterfeit item. In contract, according to some embodiments described herein, the publication system can verify the authenticity of the item listed for sale based on the verification code embedded in the item.

According to some embodiments, a garment can include a unique weaving pattern in a subsection of the garment. The validation code can be woven in the weft and warp of the garment. The weft can be the horizontal lines of the weave, and the warp can be the vertical lines of the weave. In some instances, the techniques for encoding and decoding the validation code based on the weft and warp information in the garment can vary based on the different types of knitting patterns (e.g., weaving pattern, warp knitting pattern, weft knitting pattern).

For example, the validation code can be a binary code that is decoded from an asymmetric pattern woven in the garment. Continuing with this example, the weft that goes over the warp is represented as '1' and the weft that goes under the warp is represented as '0.' The string of binary numbers can be a validation code that is later validated using an authentication database. The authentication database can be maintained by a third-party authentication server, the garment manufacturer, or the online marketplace.

The weft and warp information in the garment can be captured by a scanning device, a camera, or visual eye inspection. For example, the scanning device can scan the asymmetric pattern woven in the garment to determine the weft and warp information in the garment. The camera can capture an image of a subsection of the garment that contains the asymmetric pattern. In some instances, the weft and warp information from the asymmetric pattern can be decoded with a naked eye by contrasting threads in the woven garment. Alternatively, when the garment is not woven, a tag can contain the validation code. The tag can be attached to the garment as a label. The validation code can be a unique code that is specifically generated for the garment.

According to some embodiments, the validation code contains authentication information used to detect counterfeit items. In some instances, the validation code associated with a garment can be decoded from the weft and warp information in the garment. Once the validation cod is decoded, an authentication system can access authentication codes associated with the authentic garments. The authentication codes can be stored in an authentication database maintained by the publication system or a third-party server. By comparing the validation code with the authentication codes, the authentication system can verify that the garment is authentic and not a counterfeit. Subsequently, the garment listed for sale in the publication system can be labeled as being authentic.

In addition to the authentication information, the weft and warp information in the garment can encode other information that is relevant to the garment. For example, the weft and warp information can contain a maintenance code associated with the garment. The maintenance code can include washing and handling care information (e.g., cold wash, tumble dry, dry clean). Additionally, the weft and warp information can contain an access code. For example, the access code can be encoded in a work uniform to permit access to a restricted area (e.g., entry to a building, or season ticket entry to a baseball game). Moreover, the weft and warp information can contain a style code associated recommended matching patterns or garments. For example, the authentication system 150 can access recommended matching patterns or recommended matching garments from the vendor server 130 using the style code. Furthermore, the weft and warp information can contain product information, such as size, color, fitting, price, material of the product, location of manufacturing, and so on. The product information of the item can automatically be uploaded by the publication system when the item is being listed for sale.

According to some embodiments, techniques described herein can reduce counterfeits by introducing an authentication process in the publication system. Additionally, techniques describe herein embed digital information in an item, such as a verification code, maintenance code, access code, style code, and product information. For example, the authentication process can use a validation code decoded from the weft and warp information weaved in the garment to verify that the garment is authentic. The authentication process can be performed in real-time by obtaining the weft and warp from an image of the garment received at a time of listing the garment.

With reference to FIG. 1, an example embodiment of a high-level client-server-based network architecture 105 is shown. A networked system 102, in the example form of a network-based publication system 142 or code reader 144, provides server-side functionality via a network 104 (e.g., the Internet or wide area network (WAN)) to one or more user devices 110 (also referred to as a "client device"). FIG. 1 illustrates, for example, a web client 112, client application 114, and a programmatic client 116 executing on user device 110. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The user device 110 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box (STB), or any other communication device that a user may utilize to access the networked system 102. In some embodiments, the user device 110 may comprise a display module to display information (e.g., in the form of user interfaces). In further example embodiments, the user device 110 may comprise one or more of a touch screen, accelerometer, gyroscope, camera, microphone, global positioning system (GPS) device, and so forth. The user device 110 may be a device that is used by a user 106 to perform a transaction involving items within the networked system 102. In one embodiment, the networked system 102 is a network-based marketplace that responds to requests for product listings, publishes publications comprising product listings (e.g., item listings) of products available on the network-based marketplace, authenticates products, and manages payments for these marketplace transactions.

Each user device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site (e.g., online marketplace) application is included in a given user device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, or to verify a method of payment). Conversely, if the e-commerce site application is not included in the user device 110, the user device 110 may use its web browser to access the e-commerce site (or a variant thereof) hosted on the networked system 102.

One or more users 106 may be a person, a machine, or other means of interacting with the user device 110. In example embodiments, the user 106 is not part of the network architecture 105, but may interact with the network architecture 105 via the user device 110 or other means. For instance, the user 106 provides input (e.g., touch screen input or alphanumeric input) to the user device 110 and the input is communicated to the networked system 102 via the network 104. In this instance, the networked system 102, in response to receiving the input from the user 106, communicates information to the user device 110 via the network 104 to be presented to the user 106. In this way, the user 106 interacts with the networked system 102 using the user device 110.

An application program interface (API) server 120 and a web server 122 are coupled to, and provide programmatic and web interfaces respectively to, one or more application servers 140. The application server 140 hosts the publication system 142, the code reader 144, and an authentication system 150, each of which may comprise one or more modules or applications and each of which may be embodied as hardware, software, firmware, or any combination thereof. The application server 140 is, in turn, shown to be coupled to one or more database servers 124 that facilitates access to information storage repositories (e.g., authentication database 126, listing database 128).

The listing database 128 can be a storage device that stores information to be posted (e.g., publications or listings) to the publication system 142. The listing database 128 comprises information for items currently listed on the online marketplace such as comparable price data for items that are similar to the listed item, in accordance with example embodiments. Additionally, the listing database 128 includes item attributes for a specific item. For example, the listing database 128 can include product information and a product description for the specific item.

The authentication database 126 can be a storage device that stores authentication codes associated with authentic items. For example, the authentication codes can be obtained from the vendor (e.g., garment manufacturer) of the item or from a third-party authentication service. Additionally, the authentication database includes historical price data for the listed item, such as a previously sold price. Moreover, the authentication database 126 stores ownership information of each seller in the online marketplace. Using the seller information, the publication system 142 may only allow an owner of the item to list the item for sale in order to reduce stolen items being listed. The ownership information can include a chain of title for an item and other ownership information associated with the item.

Additionally, a vendor application 132, executing on one or more vendor server 130s, is shown as having programmatic access to the networked system 102 via the programmatic interface provided by the API server 120. For example, the vendor application 132, utilizing information retrieved from the networked system 102, supports one or more features or functions on a website hosted by the vendor. The vendor website, for example, provides the authentication codes for the publication system 142 to authentic the item listed for sale.

The publication system 142 provides a number of publication functions and services to a user 106 that accesses the networked system 102. The code reader 144 likewise provides a number of functions to perform or facilitate weft and warp extraction in order to generate a validation code. While the publication system 142 and code reader 144 are shown in FIG. 1 to both form part of the networked system 102, it will be appreciated that, in alternative embodiments, each system 142 and 144 may form part of a service that is separate and distinct from the networked system 102. In some embodiments, the code reader 144 may be included in the user device 110 or vendor server 130.

The authentication system 150 provides functionality operable to perform various authentication techniques using a validation code derived from the weft and warp information of an item to verify the authenticity of the item, according to some embodiments. For example, the authentication system 150 receives an image of a garment and extracts the weft and warp information from the garment. Using the extracted weft and warp information, the authentication system 150 determines a validation code for the garment. Subsequently, the validation code is compared against authentication codes to verify whether the garment is authentic. Some of the information, including the authentication codes, to determine the authenticity of the garment can be accessed or obtained from the authentication database 126, listing database 128, or the vendor server 130.

Additionally, the authentication system 150 provides notification services corresponding to events. For example, the authentication system 150 can send a notification to the user 106 based on a determination that the item is not authentic. The notification can include that the item is not being listed on the publication system 142. Alternatively, the authentication system 150 can send a notification to the user 106 based on a determination that the item is authentic, such as an approval to list the item in the publication system 142. Accordingly, in response to detecting a notification event (e.g., when the confidence score transgresses a predetermined threshold), the authentication system 150 provides a notification message to the user device 110 associated with the user 106. In example embodiments, the notification message includes a textual, graphical, or audible message that provides a notice to the user 106 associated with the authenticity of the item.

Further, while the client-server-based network architecture 100 shown in FIG. 1 employs a client-server architecture, the present subject matter is, of course, not limited to such an architecture, and could equally well find application in a distributed, or peer-to-peer, architecture system, for example. Publication system 142, code reader 144, or authentication system 150 could also be implemented as standalone software programs, which do not necessarily have networking capabilities. For example, the authentication system 150 can determine the authenticity of an item without access to the application server 140 when the authentication system 150 does not have networking capabilities.

In example embodiments, the web client 112 accesses the authentication system 150 via the web interface supported by the web server 122. Similarly, the programmatic client 116 accesses the various services and functions provided by the authentication system 150 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
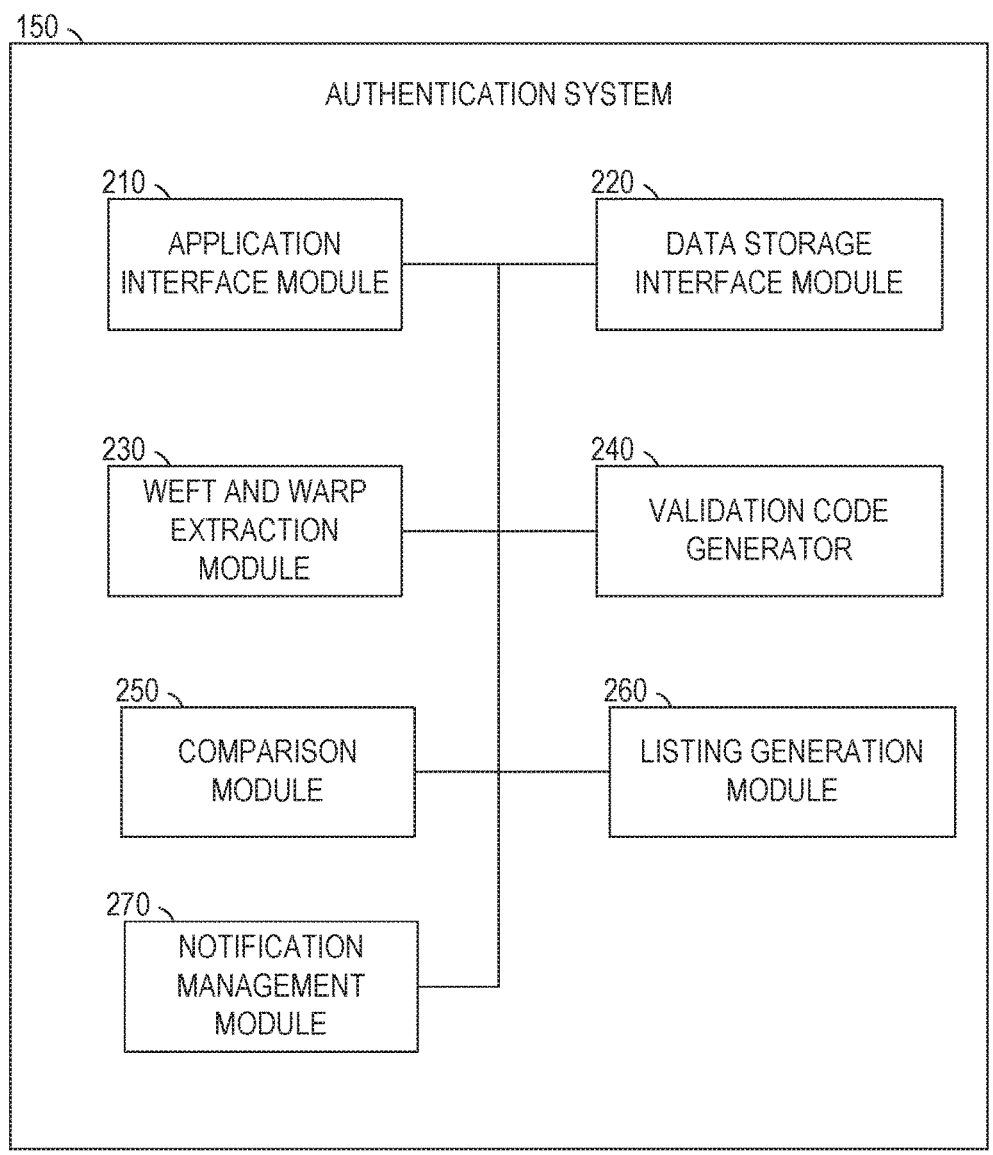
FIG. 2 is a block diagram illustrating an example embodiment of the authentication system of FIG. 1 including multiple modules forming at least a portion of the client-server system of FIG. 1.

FIG. 2 is a block diagram illustrating an example embodiment of the authentication system 150 of FIG. 1 including multiple modules forming at least a portion of the network architecture 100 of FIG. 1. The modules 210-270 of the illustrated authentication system 150 include an application interface module 210, a data storage interface module 220, a weft and warp extraction module 230, a validation code generator 240, a comparison module 250, a listing generation module 260, and a notification management module 270. In some embodiments, the components of the authentication system 150 are included in the application server 140 of FIG. 1. However, it will be appreciated that in alternative embodiments, one or more components of the authentication system 150 described below are included, additionally or alternatively, in other devices, such as one or more of the user device 110 or the vendor server 130 of FIG. 1. It will also be appreciated that the authentication system 150 is deployed in systems other than online marketplaces.

The modules 210-270 of the authentication system 150 are hosted on dedicated or shared server machines that are communicatively coupled to enable communications between server machines. One or more of the modules 210-270 are deployed in one or more datacenters. Each of the modules 210-270 is communicatively coupled to the other modules 210-270 and to various data sources, so as to allow information to be passed between the modules 210-270 of the authentication system 150 or so as to allow the modules 210-270 to share and access common data.

The application interface module 210 is a hardware-implemented module that facilitates communication of data between the authentication system 150 and the user device 110, the vendor server 130, and other devices connected to the network 104. In particular, the application interface module 210 provides a user-facing graphical user interface (GUI) for interfacing with one or more user devices 110, thus providing a bi-directional interface. For example, the application interface module 210 interfaces with the API server 120 to provide a programmatic interface to user device 110 or to provide a web interface to the user device 110. As such, the application interface module 210 facilitates the providing of functions, webpages, data, code, or other web resources between the authentication system 150 and the user device 110.

In operation, the authentication system 150 receives data from the one or more user devices 110 (e.g., via the application interface module 210). The received data from the user devices 110 correspond to a number of inputs or requests related to, for example, one or more images of the item being listed for sale. The received images can include an asymmetrical pattern being woven in the item. Additionally, the received data can include item attributes, other item information, authentication information, and owner information, as described below in greater detail.

The data storage interface module 220 is a hardware-implemented module that facilitates accessing the authentication codes for the authentication system 150. In an example embodiment, the data storage interface module 220 interfaces with the authentication database 126 of FIG. 1 to access the authentication codes associated with authentic items. As previously mentioned, the authentication codes can be obtained from the vendor server 130.

The weft and warp extraction module 230 is a hardware-implemented module that extracts weft information and warp information from a received image, according to some embodiments. For example, the weft and warp information can be woven into an asymmetric section of a garment by the garment manufacturer (e.g., vendor). The extraction techniques are further described in FIG. 3. In operation, the weft and warp extraction module 230 receives an image associated with an item listed for sale from a device, such as, but not limited to, the user device 110 or the vendor server 130 of FIG. 1.

The validation code generator 240 is a hardware-implemented module that generates a validation code based on the extracted weft and warp information, according to some embodiments. In some instances, the validation code can be a binary code that is decoded based on an asymmetric pattern woven in the garment. For example, the weft that goes over the warp is represented as '1' and the weft that goes under the warp is represented as '0.' The string of binary numbers can be the validation code that is later compared against authentication codes from the authentication database 126.

The comparison module 250 is a hardware-implemented module that compares the validation code with the authentication codes of authentic items. An item is verified to be authentic when the verification code matches one of the authentication codes or transgresses a predetermined threshold associated with one of the authentication codes. In some instances, the predetermined threshold can be a percentage similarity (e.g., 95%) with one of the authentication codes. For example, to allow for extraction errors associated with extracting the correct weft and warp information, the comparison module 250 can determine that the validation code corresponds to one of the authentication codes when there is at least a 95% similarity between the two codes based on an error threshold (e.g., 95% similarity). In some instances, the error threshold accounts for potential errors in the detection of the code due to image recognition issues, but also for damage to the garment or the encoding itself. The comparison techniques are further described in FIG. 6. In operation, the comparison module 250 receives the validation code from the validation code generator 240 and the authentication codes from the authentication database 126 to perform a comparison.

In some instances, the comparison module can include a confidence score calculator that calculates a confidence score based on the comparison performed by the comparison module 250. For example, when the validation code is a binary code, the confidence score is calculated based on the number of bits that are the same as one of the authentication codes. Techniques for the confidence score calculation are further described in FIG. 6.

Figure 6:
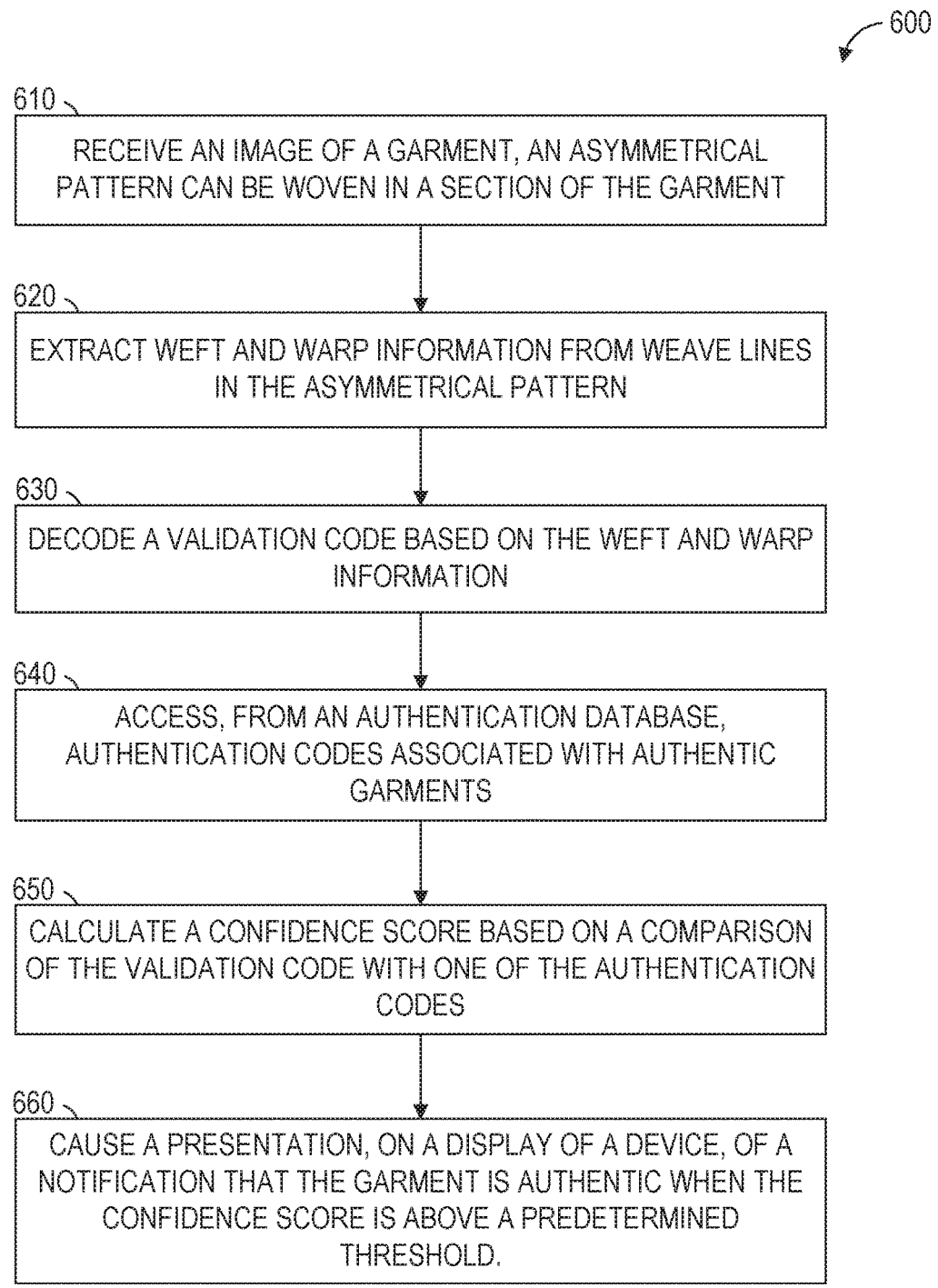
FIG. 6 is a flowchart illustrating an example method of determining the authenticity associated with an item listed for sale, according to some embodiments.

The listing generation module 260 is a hardware-implemented module that facilitates the automatic generation of a listing on the online marketplace when it is determined that the listing is authentic. Based on the confidence score, the listing generation module 260 either approves or denies the listing for the item to be published in the publication system 142. FIG. 6 further describes actions performed by the listing generation module 250.

The notification management module 270 is a hardware-implemented module that facilitates providing user notifications related to a determination that an item for sale is authentic or a counterfeit. In operation, the notification management module 270 sends a notification to the user device 110 to either approve or deny the item listing based on the confidence score.

Determining a Validation Code from the Weft and Warp Information

Figure 3:
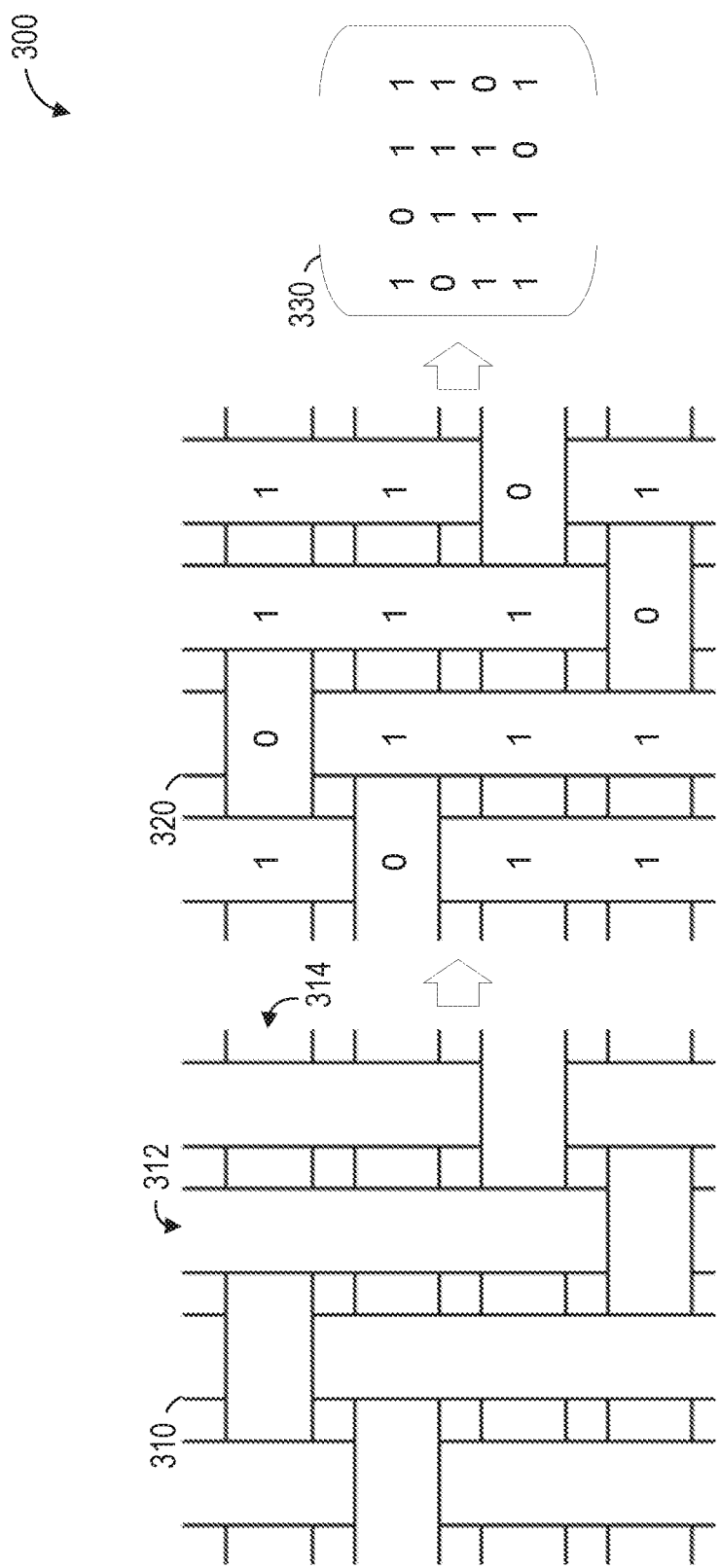
FIG. 3 illustrates an example process diagram for determining a validation code using weft and warp information, according to some embodiments.

FIG. 3 illustrates an example process diagram 300 for determining a validation code using weft and warp information of a garment, according to some embodiments.

As previously mentioned, the weft and warp extraction module 230 of FIG. 2 can receive a first image 310 of a subsection of a garment. The image can be received from the user device 110 of FIG. 1. The first image 310 of the woven garment includes horizontal weave lines 314 and vertical weave lines 312. In some instances, the weft information can be extracted from the horizontal weave lines 312, and the warp information can be extracted from the vertical weave lines 314.

In example embodiments, the weft and warp information extracted is obtained using an image extraction technique. The image extraction technique can include using a scale-invariant feature transform (SIFT) algorithm technique, using an image gradient technique, machine vision algorithms (e.g., ImageNet), or other image extraction techniques.

For example, as illustrated in the second image 320, the weft and warp extraction module 230 can determine a binary code where a '1' is associated with the weft going over the warp, and a '0' is associated with the weft going under the warp. In the first row of the second image 320, the weft goes over the warp in the first column, the third column, and the fourth column. Additionally, the weft goes under the warp in the second column. Accordingly, the binary code associated with the first row is [1 0 1 1]. Similar determination can occur for the second, third and fourth rows of the second image 320.

Subsequently, the validation code generator 240 of FIG. 2 can generate a validation code 330 based on the weft and warp information extracted from the second image 320. In this example, the validation code 330 associated with the first image 310 and second image 320 is the following matrix:

$$\begin{bmatrix} 1 & 0 & 1 & 1 \\ 0 & 1 & 1 & 1 \\ 1 & 1 & 1 & 0 \\ 1 & 1 & 0 & 1 \end{bmatrix}$$

Subsequently, the comparison module 250 can compare the validation code 330 with the set of authentication codes from the authentication database 126. In some instances, if the validation code 330 is similar to one of the authentication codes from the set of authentication codes, then the garment associated with the first image 310 and the second image 320 is determined to be authentic. The validation code 330 can be similar to an authentication code if the validation code 330 matches the authentication code. Additionally, the validation code 330 can be similar to an authentication code if a confidence score associated with the validation code 330 and the authentication code is above a predetermined threshold.

Detection of a Counterfeit Item Using the Validation Code

Conventional counterfeit detection techniques are based on flagging a seller as a counterfeit seller and removing the seller from the online marketplace. However, conventional counterfeit detection techniques may not be able to prevent the seller from creating a new account to sell counterfeit items.

Figure 4:
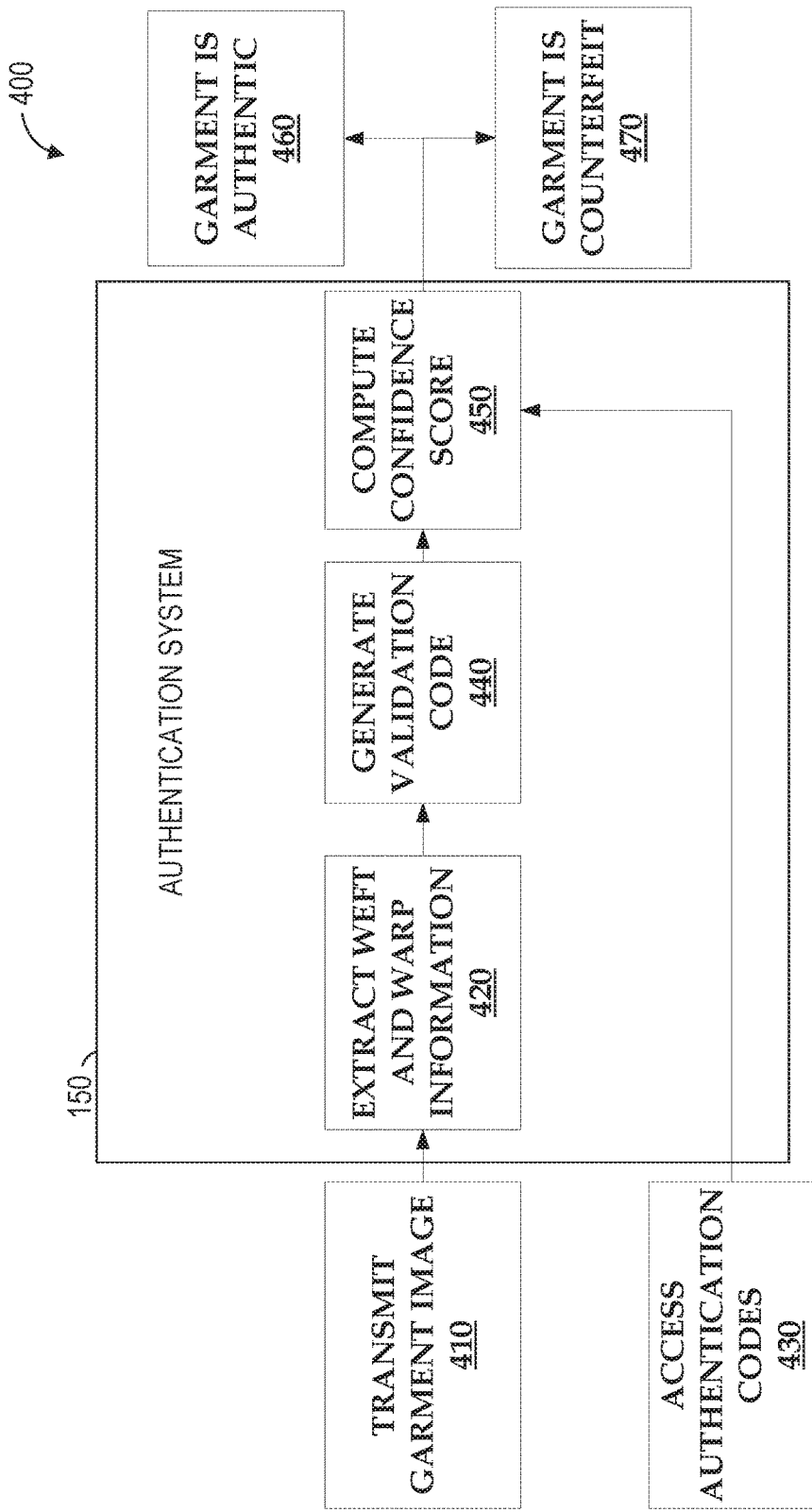
FIG. 4 illustrates an example process diagram of determining the authenticity of an item listed for sale using the authentication system, according to some embodiments.

FIG. 4 illustrates an example process 400 of determining the authenticity of a garment using the authentication system 150, according to some embodiments. In example embodiments, a counterfeit item is identified by comparing a validation code associated with the item with authentication codes obtained from an authentication database 126.

At operation 410, the user (e.g., seller) can transmit (e.g., upload) a garment image to commence the selling process. The authentication system 150, using the weft and warp extraction module 230, extracts the weft and warp information from the garment image at operation 420. FIG. 3 describes an example extraction method.

Additionally, the authentication system 150, using the data storage interface module 220, can access authentication codes from the authentication database 126 at operation 430. For example, the vender server 130, which can be maintained by the garment manufacturer, stores authentication codes associated with authentic garments in the authentication database 126.

Moreover, the authentication system 150, using the validation code generator 240, can generate a validation code for the garment at operation 440. The validation code is generated based on the extracted weft and warp information. The validation code 330 in FIG. 3 is an example of a validation code generated at operation 440.

Furthermore, using the comparison module 250, which includes a confidence score calculator, the authentication system 150 can compute a confidence score for the garment, at operation 450. In some instances, the confidence score is computed by comparing the validation code with an authorization code from the plurality of authentication codes accessed at operation 430. Continuing with the example above, the validation code's string of binary numbers can be matched against the authentication code's string of binary numbers. For example, the confidence score can be the percentage of binary numbers that are the same for the validation code and the authentication code.

The confidence score can be computed by the confidence score calculator by comparing the validation code with an authentication code. In some instances, the confidence score computation can be based on either basic similarity measures or on machine-learned techniques. The basic similarity measures can include cosine similarity, hashing functions, linear regression models, and so on. The machine-learned techniques can be based on a logistic regression model, a neural networks model, and so on.

Subsequently, the authentication system can determine whether the garment is authentic based on the confidence score. For example, at operation 460, when the confidence score is above a predetermined threshold (e.g., 95%), then the garment is determined to authentic. Alternatively, at operation 470, the garment is determined to be a counterfeit when the confidence score is lower than the predetermined threshold.

Moreover, the authentication system 150 can transmit a notification message to the user device 110 based on the determination that the garment is either authentic or a counterfeit.

Incorporating the Framework in Different Platforms

Figure 5:
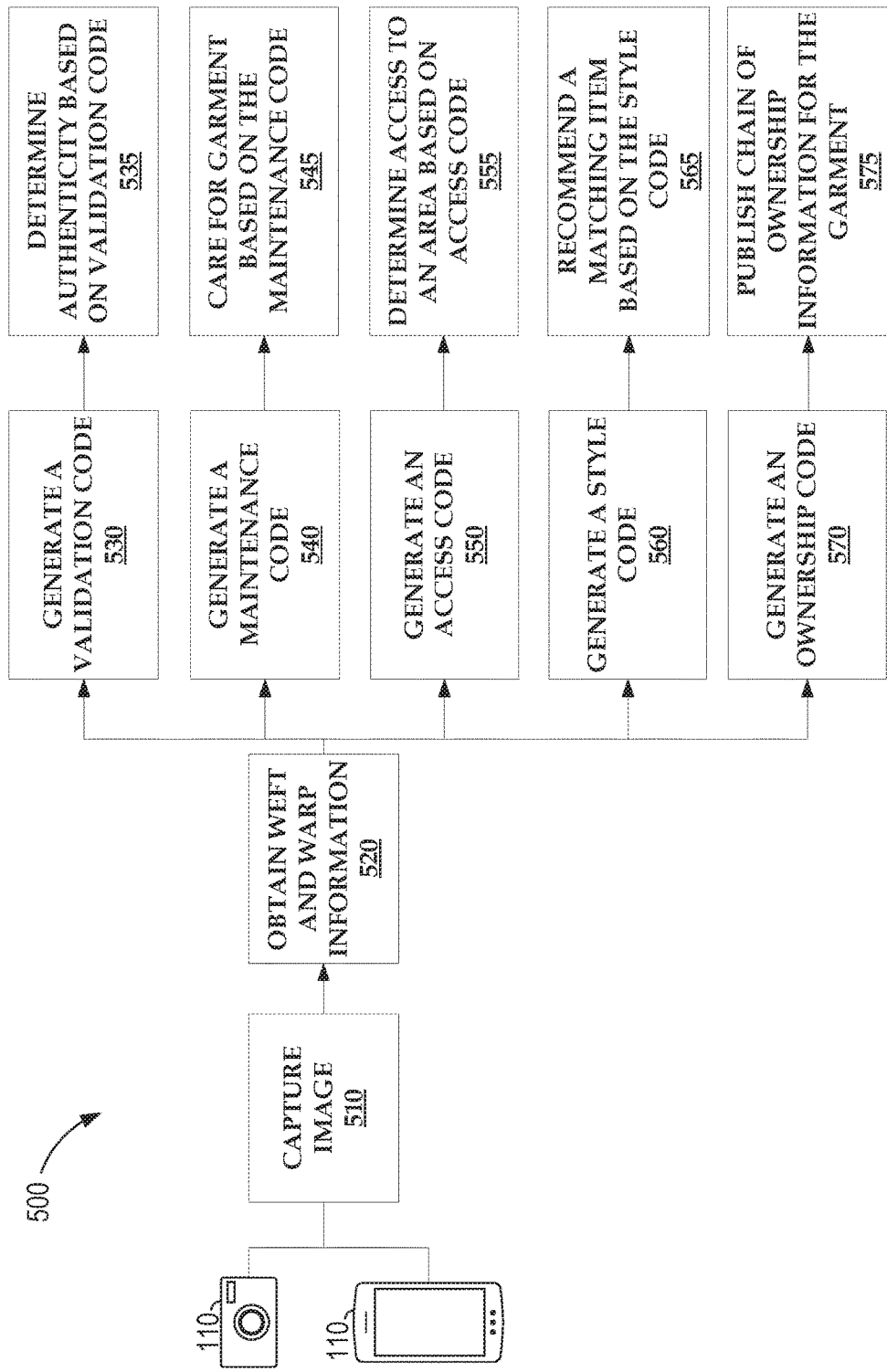
FIG. 5 illustrates an example selling flow process using the authentication system, according to some embodiments.

According to some embodiments, the authentication system 150 can be incorporated in different platforms (e.g., online marketplace, entry access). FIG. 5 illustrates an example flow process 500 for different platforms using the authentication system 150, according to some embodiments.

At operation 510, the authentication system 150 can receive an image from a user. For example, the user may be a seller on the online marketplace. Additionally, the captured image can be of an item that includes an embedded code. As previously mentioned, the code can be embedded in the weft and warp of a garment that is woven. The image can be captured using the user device 110 (e.g., smartphone, camera).

At operation 520, the authentication system 150 can extract the weft and warp information from the captured image. FIG. 3 describes a method of obtaining the weft and warp information for the image. In some instances, the authentication system 150 can perform operations 530, 540, 550, or 560 using the weft and warp information obtained at operation 520.

At operation 530, the authentication system 150 can generate a validation code using the weft and warp information obtained at operation 520. FIG. 3 describes a method of generating the validation code based on the weft and warp information. Additionally, based on the validation code, the authentication system 150 can determine the authenticity of the garment at operation 535. FIG. 4 illustrates an example method for determining the authenticity of a garment based on the validation code. Furthermore, when it is determined that the generated item listing is authentic, the publication system 142 can list the garment on the online marketplace. Alternatively, when it is determined that the garment is a counterfeit, the publication system 142 can prevent the garment from being listed on the online marketplace.

Often in conventional systems, when a counterfeit item is present in the online marketplace, it can diminish the customer experience. Hence, using the techniques described herein, once the authentication system 150 detects a counterfeit item, the authentication system can demote or remove the counterfeit item from the search results displayed to the user device 110.

At operation 540, the authentication system 150 can generate a maintenance code for the garment using the weft and warp information obtained at operation 520. The maintenance code can be generated using similar techniques as described in FIG. 3. In some instances, the technique for determining the maintenance code or any other generated code can be different than the technique for determining the validation code. For example, the key (i.e., a first key) to decoding the maintenance code from the obtained weft and warp information can be different than the key (i.e., a second key) for decoding the validation code. Alternatively, the maintenance code can be embedded in a different subsection of the asymmetric section of the garment.

Subsequently, at operation 545, a system (e.g., the authentication system 150, washing machine, dryer) can care for the garment based on the maintenance code that is generated at operation 540. In some instances, the maintenance code can include garment care instructions such as washing instructions, ironing instructions, and so on. For example, the garment can be scanned by a mobile device or a washing machine to generate the maintenance code from the obtained weft and warp information. Additionally, the maintenance code can include a web address that includes a video tutorial. Furthermore, the maintenance code can be read by the washing machine or dryer to automatically configure the right settings (e.g., cold wash, tumble dry only) for the machine. Moreover, garments (e.g., socks) can automatically be sorted or paired by a dryer using the maintenance code.

At operation 550, the authentication system 150 can generate an access code using the weft and warp information obtained at operation 520. The access code can be generated using similar techniques as described in FIG. 3. Subsequently, at operation 555, the authentication system 150 can provide access to a restricted area based on the access code generated at operation 550. The verification of access based on the access code can be determined using similar techniques as described in FIG. 4. For example, the garment, such as a uniform or a hat, can include an access code embedded in the garment. The authentication system 150 can permit entry to an area (e.g., building, facility, room, sporting event) by verifying the access code. The access code can be verified using similar techniques described in FIG. 4, such as comparing the generated access code with validated access codes stored in the authentication database 126. The access code can be combined with a multi-factor authentication process, such as the access code on the garment and another authentication factor. The other authentication factor can include an identification card, biometric information, a ticket to an event, and/or a mobile application on the user device 110.

At operation 560, the authentication system 150 can generate a style code using the weft and warp information. The style code can be generated using similar techniques as described in FIG. 3. Furthermore, at operation 565, the authentication system 150 can recommendation a matching item based on the style code. In some instances, the recommended matching item can be presented on the display of the user device 110. The style code can include style recommendations for matching accessories or matching garments. For example, the style recommendation can suggest a color to match the garment having the style code, or suggest another garment to match the garment having the style code. Moreover, the style code can include product information for the garment, and the publication system can automatically fill-in the product information for an item listed for sale using the style code.

At operation 570, the authentication system 150 can generate an ownership code using the weft and warp information. The ownership code can be generated using similar techniques as described in FIG. 3. Furthermore, at operation 575, the authentication system 150 can publish the chain of ownership information for the garment based on the ownership code. The chain of ownership information can be accessed internally in the networked system 102 or accessed from the vendor server 130. Additionally, the chain of ownership information can be updated by the publication system 142 after the garment is sold. Moreover, the confidence score associated with the authenticity of the garment can be updated based on the chain of ownership information. For example, if the seller information matches the chain of ownership information, then the confidence score is increased. Alternatively, if the seller information does not match the chain of ownership information, then the confidence score is decreased. The seller information may have been previously stored in the publication system 142 or received from user device 110. Moreover, the publication system 142 can prevent the garment from being listed for sale when the authentication system 150 determines that the seller information does not match the chain of ownership information.

FIG. 6 is a flowchart illustrating an example method 600 of determining the authenticity of garment using the weft and warp information encoded in the weave of the garment, in accordance with an example embodiment. In this embodiment, the method 600 includes operations such as receiving a garment image of a garment (operation 610), extracting weft and warp information from the garment image (operation 620), decoding a validation code based on the weft and warp information (operation 630), accessing authentication codes associated with authentic garments (operation 640), calculating a confidence score by comparing the validation code with an authentication code (operation 650), and presenting a notification when the garment is authentic (operation 660). The example method 600 will be described below, by way of explanation, as being performed by certain modules. It will be appreciated, however, that the operations of the example method 600 can be performed in any suitable order by any number of the modules shown in FIG. 1, FIG. 2, and FIG. 7. Unless specifically stated otherwise, the terms "a" or "an" are herein used, as is common in patent documents, to include one or more than one instance. Finally, as used herein, the conjunction "or" refers to a non-exclusive "or," such as "and/or," unless specifically stated otherwise.

In an example embodiment, the method 600 starts at operation 610, in which the authentication system 150 receives an image of a garment. In one example, the authentication system 150 receives the image when the user device 110 transmits garment image at operation 410 in FIG. 4. The garment can include an asymmetrical pattern woven in a section of the garment. In some instances, the image can be received from the user device 110, the vendor server 130, or another device connected to the network 104. The image can be transmitted by the user device 110, by an API on the user device 110, by the user 106, by the vendor server 130, or by the network. Additionally, the image can be received by the application interface module 210 of FIG. 2. Furthermore, a code reader can receive the image at operation 610. The code reader may be part of the user device 110 or may be part of the application server 140. For example, a camera on the user device 110 can capture the image and transmit the image to a code reader.

At operation 620, the authentication system 150 extracts weft and warp information from weave lines in the asymmetrical pattern in the received image received at operation 610. For example, the weft and warp information includes weft information derived from horizontal weave lines in the asymmetrical pattern and warp information derived from the vertical weave lines in the asymmetrical pattern. In some instances, the extraction is performed by the weft and warp extraction module 230 of FIG. 2. FIG. 3 describes examples of the extraction performed at operation 620.

For example, as illustrated in the second image 320 of FIG. 3, the weft and warp extraction module 230 can determine a binary code where a '1' is associated with the weft going over the warp, and a '0' is associated with the weft going under the warp. In the first row of the second image 320, the weft goes over the warp in the first column, the third column, and the fourth column. Additionally, the weft goes under the warp in the second column. Accordingly, the binary code associated with the first row is [1 0 1 1]. Similar determination can occur for the second, third and fourth row of the second image 320.

At operation 630, the authentication system 150 determines (e.g., decodes) a validation code based on the weft and warp information extracted at operation 620. In some instances, the extraction is performed by the validation code generator 240 of FIG. 2. FIG. 3 describes examples of the decoding performed at operation 630.

Continuing with the example described in FIG. 3, the validation code generator 240 can generate a validation code 330 based on the weft and warp information extracted from the second image 320. In the example in FIG. 3, the validation code 330 associated with the first image 310 and second image 320 is the following matrix:

$$\begin{bmatrix} 1 & 0 & 1 & 1 \\ 0 & 1 & 1 & 1 \\ 1 & 1 & 1 & 0 \\ 1 & 1 & 0 & 1 \end{bmatrix}$$

In some instances, the weft and warp information includes weave lines with a plurality of colors, and the validation code is determined based on the plurality of colors.

In some instances, the weft and warp information includes a thread material information for the weave lines, and the validation code is further determined based on the thread material information. Additionally, when the thread material information is that the weave lines have a metallic thread, the validation code can be based on a unique characteristic associated with the metallic thread. For example, the unique characteristic associated with the metallic thread can be a resonant frequency of the metallic thread. The resonant frequency can be determined by pinging a radio frequency against the metallic thread.

In some instances, the authentication system 140 can detect the presence of metal to varying sensitivities. Additionally, the authentication system 140 can detect the differences in the resonant frequencies between the warp and weft. For example, a weft that passes over a given metallic thread twelve times can be detected as a uniquely different signature from a weft that passes over that same length of metallic thread five times. Accordingly, the authentication system 140 can distinguish between two different metallic garments based on the number of times the weft passes over a specific length of thread.

At operation 640, the authentication system 150 accesses, from an authentication database, authentication codes associated with authentic garments. In some examples, the authentication codes can be accessed using the data storage interface module 220 of FIG. 2.

The authentication codes can include a plurality of authentication codes associated with a specific garment. For example, a vendor may manufacture a limited number of purses, and each purse can have a unique authentication code. The authentication codes can be stored in the authentication database 126. Additionally, the authentication codes can be obtained directly from the vendor server 130 by using network 104 of FIG. 1. Alternatively, the authentication codes can be stored or generated internally by networked system 102 using a key-generator that is received from the vendor server 130.

At operation 650, the authentication system 150 calculates a confidence score based on a comparison of the validation code with one of the authentication codes. In some instances, the determination at operation 650 is performed by the comparison module 250 and the confidence score calculation module of FIG. 2. The authentication system 150 can use a processor (e.g., processor 702 in FIG. 7) for calculating the confidence score. The validation code can be generated at operation 630 and the authentication code can be obtained at operation 640.

In some instances, the comparison at operation 650 can be performed using a bitwise operation or an overlap technique to determine the likelihood that the validation code and the authentication code are the same or similar. Additionally, when the confidence score is above a first predetermined threshold (e.g., 90%), then the authentication system 150 determines that the garment is authentic. Furthermore, when the confidence score is below a second predetermined threshold (e.g., 80%), then the authentication system 150 determines that the garment is a counterfeit. For example, when the validation code is a binary sequence of binary bits (i.e., '0' and '1'), then the confidence score can be directly correlated to the number of binary bits matching the authentication code. Continuing with the example, when 90% of the bits in the validation code match the bits in the authentication code, then the confidence score is 90.

At operation 660, the authentication system 150 determines that the garment is authentic based on the confidence score transgressing a first predetermined threshold. For example, when a first predetermined threshold is 90 and the confidence score is higher than 90, then the authentication system 150 classifies the garment as authentic. Additionally, the authentication system 150 can determine that the garment is not authentic when the confidence score is below a second predetermined threshold. For example, when the second predetermined threshold is 80, and the confidence score is below 80, then the authentication system 150 classifies the garment as a counterfeit.

In response to the determination that the garment is authentic, the publication system 142 causes a presentation, on a display of the user device 110, and a notification at operation 660. For example, the notification can include a message to the user 106 of the user device 110 that the garment is authentic. Additionally, when the garment is listed for sale in the networked system 102, the garment listing can include a verification that the garment is authentic. In some instances, the notification message is sent by the notification management module 270 of FIG. 2.

In some instances, the publication system 142 of FIG. 1 can be configured to cause a presentation, on a display of a device, of a verification that the garment is authentic when the confidence score is above a predetermined threshold (e.g., 80% accuracy, 90% accuracy, 95% accuracy).

In some instances, the publication system 142 is further configured to publish a garment listing associated with the garment based on the verification that the garment is authentic. Additionally, the publication system 142 can publish a garment listing for the garment, and the garment listing can include a notification that the garment is certified to be authentic. Alternatively, the publication system 142 can remove the garment listing for the garment when the authentication system 150 determines that the garment is a counterfeit. For example, the publication system 142 is further configured to remove a garment listing associated with the garment when the confidence score is below the second predetermined threshold.

In some instances, the code reader 144 is further configured to determine an ownership code based on the weft and warp information. For example, the weft and warp information extracted at operation 620 can further include an ownership code. Additionally, the authentication system 150 is further configured to access, from an ownership database, a chain of ownership information associated with the ownership code. In one example, the ownership database can be part of the authentication database 126 in FIG. 1. In another example, the ownership database can be accessed by the authentication system 150 from the vendor server. In yet another example, the ownership database can be managed and updated by the networked system 102 when the garment is sold in the online marketplace of the networked system 102. Furthermore, the publication system 142 is further configured to publish the chain of ownership information. For example, the publication system 142 can include the chain of ownership information in the garment listing. Moreover, in some examples, the publication system 142 is further configured to receive seller information associated with a seller of the garment and remove the garment listing associated with the garment when the chain of ownership information does not match the seller information. For example, if the seller information can be linked to a first person, but the chain of ownership information links a second person as the owner of the garment, then the publication system 142 determines that the garment listed for sale is not being listed by the actual owner and therefore removes the garment listing from the online marketplace.

In some instances, the code reader 144 is further configured to determine a maintenance code based on the weft and warp information. Additionally, the authentication system 150 is further configured to access, from a vendor server, care instructions associated with the maintenance code. Furthermore, the publication system 142 is configured to cause a presentation, on the display of the device, of the accessed care instructions.

In some instances, the code reader 144 is further configured to determine an access code based on the weft and warp information. Additionally, the authentication system 150 is further configured to access, from a server, a grant code associated with an area and verify access to the area based on the access code matching a grant code. Moreover, the publication system 142 is configured to cause a confirmation, on the display of the device, of access being granted to the area based on the verification. For example, an employee can be allowed accessed to a building based on the grant code being embedded in the garment of the employee. The garment can be provided by the employer of the employee.

In some instances, the code reader 144 is further configured to determine a style code based on the weft and warp information, and the authentication system 150 is further configured to access, from a vendor server, a matching item associated with the style code. Subsequently, the publication system 142 is configured to cause a presentation, on the display of the device, of the matching item. For example, the publication system 142 can present a matching outfit to the user device 110. Additionally, the publication system 142 can present matching colors that correspond to the garment.

In some instances, the authentication system is further configured to access, from a price database, a suggested price for the garment and update the confidence score based on the suggested price. For example, the price database can be included in the authentication database 126 of FIG. 1. In some instance, the confidence score can decrease when a listed price associated with the garment listed for sale is below the suggested price.

Figure 7:
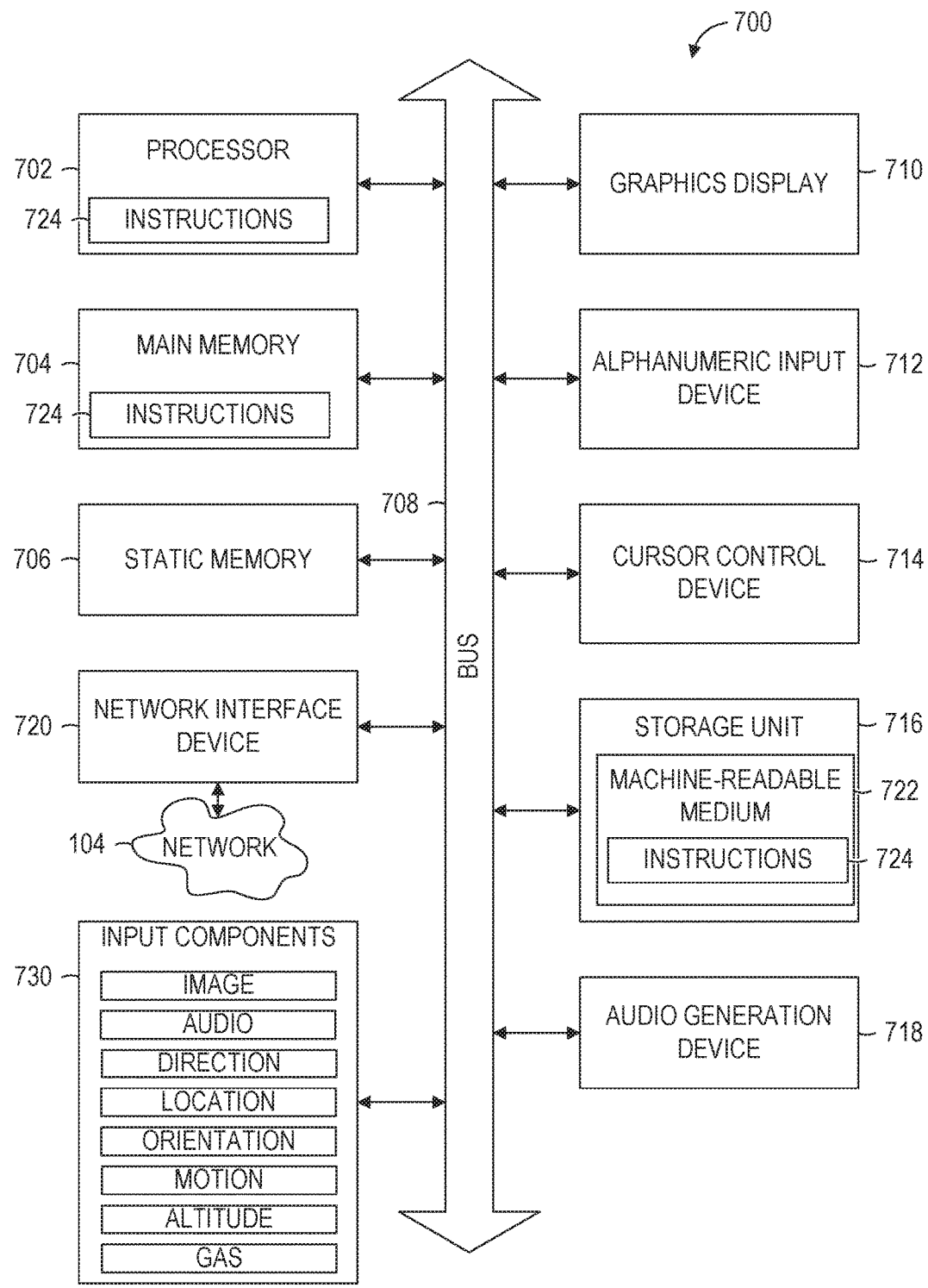
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part. The authentication system 150 can be an example of the machine 700.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a STB, a PDA, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein. The processor 702 can calculate the confidence score at operation 650.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media 722 (e.g., tangible and non-transitory machine-readable media). The instructions 724 may be transmitted or received over the network 104 via the network interface device 720. For example, the network interface device 720 may communicate the instructions 724 using any one or more transfer protocols (e.g., hypertext transfer protocol (HTTP)).

The machine-readable medium 722 may include a magnetic or optical disk storage device, solid state storage devices such as flash memory, or other non-volatile memory device or devices. The computer-readable instructions 724 stored on the computer-readable storage medium 722 are in source code, assembly language code, object code, or another instruction format that is interpreted by one or more processors 702.

In some example embodiments, the machine 700 may be a portable computing device, such as a smartphone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown, in an example embodiment, to be a single medium, the term "machine-readable medium" should be taken to include a single medium or multiple media (e.g., a centralized or distributed database, or associated caches) able to store the instructions 724. The term "machine-readable medium" shall also be taken to include any medium, or combination of multiple media, that is capable of storing the instructions 724 for execution by the machine 700, such that the instructions 724, when executed by one or more processors 702 of the machine 700 (e.g., the processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory, excluding signals) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and the operations can be performed in a different order than illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 722 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 702 or other programmable processor 702. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 702 configured by software to become a special-purpose processor, the general-purpose processor 702 may be configured as respectively different special-purpose processors (e.g., comprising different hardware modules) at different times. Software (e.g., a software module) may accordingly configure one or more processors 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, a processor 702 being an example of hardware. For example, at least some of the operations of a method may be performed by one or more processors 702 or processor-implemented modules. As used herein, "processor-implemented module" refers to a hardware module in which the hardware includes one or more processors 702. Moreover, the one or more processors 702 may also operate to support performance of the relevant operations in a "cloud computing" environment or as a "software as a service" (SaaS). For example, at least some of the operations may be performed by a group of computers (as examples of machines including processors 702), with these operations being accessible via a network 104 (e.g., the Internet) and via one or more appropriate interfaces (e.g., an application program interface (API)).

The performance of certain operations may be distributed among the one or more processors 702, not only residing within a single machine, but deployed across a number of machines. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the arts. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," such as "and/or," unless specifically stated otherwise.

What is claimed is:

1. A system comprising:
    one or more computer processors; and
    one or more computer-readable mediums storing instructions that, when executed by the one or more computer processors, cause the system to perform operations comprising:
        receiving an image of a garment, the image including a section of the garment that includes an asymmetrical pattern being woven in the garment, the asymmetrical pattern created by at least a first weft thread woven through a set of warp threads;
        for each warp thread in the set of warp threads, determining a binary digit based on whether the first weft thread is woven over or under the respective warp thread, yielding a binary code;
        comparing the binary code to a set of authentication codes stored in authentication database, yielding a comparison, the authentication codes being associated with authentic garments;
        identifying, based on the comparison, a first authentication code;
        calculating a confidence score based on a percentage of binary digits in the binary code that match corresponding binary digits of the first authentication code; and
        in response to determining that the confidence score meets or exceeds a predetermined threshold score, causing a verification that the garment is authentic to be presented on a display of a device.

2. The system of claim 1, the operations further comprising:
publishing a garment listing associated with the garment based on the verification that the garment is authentic.

3. The system of claim 1, the operations further comprising:
determining an ownership code based on the binary code;
accessing, from an ownership database, a chain of ownership information associated with the ownership code; and
publishing the chain of ownership information.

4. The system of claim 3, the operations further comprising:
receiving seller information associated with a seller of the garment; and
removing a garment listing associated with the garment when the chain of ownership information does not match the seller information.

5. The system of claim 1, the operations further comprising:
removing a garment listing associated with the garment when the confidence score is below the predetermined threshold score.

6. The system of claim 1, wherein the set of warp threads includes a first warp thread that is a first color, and a second warp thread that is a second color that is different than the first color.

7. The system of claim 1, the operations further comprising:
determining a maintenance code based on the binary code weft and warp information;
accessing, from a vendor server, care instructions associated with the maintenance code; and
causing a presentation, on the display of the device, of the accessed care instructions.

8. The system of claim 1, the operations further comprising:
determining an access code based on the binary code;
accessing, from a server, a grant code associated with an area;
verifying access to the area based on the access code matching the grant code; and
causing a confirmation, on the display of the device, of access being granted to the area based on the verification.

9. The system of claim 1, the operations further comprising:
determining a style code based on the binary code;
accessing, from a vendor server, a matching item associated with the style code; and
causing a presentation, on the display of the device, of the matching item.

10. The system of claim 1, the operations further comprising:
accessing, from a price database, a suggested price for the garment; and
updating the confidence score based on the suggested price.

11. The system of claim 1, wherein the comparison is based on an overlap technique.

12. A method comprising:
receiving an image of a garment, the image including a section of the garment that includes an asymmetrical pattern being woven in the garment, the asymmetrical pattern created by at least a first weft thread woven through a set of warp threads;
for each warp thread in the set of warp threads, determining a binary digit based on whether the first weft thread is woven over or under the respective warp thread, yielding a binary code;
comparing the binary code to a set of authentication codes stored in an authentication database, yielding a comparison, the authentication codes being associated with authentic garments;
identifying, based on the comparison, a first authentication code;
calculating, by a computing device, a confidence score based on a percentage of binary digits in the binary code that match corresponding binary digits of the first authentication code; and
in response to determining that the confidence score meets or exceeds a predetermined threshold score, causing a verification that the garment is authentic to be presented on a display of a device.

13. The method of claim 12, further comprising:
publishing a garment listing associated with the garment based on the verification that the garment is authentic.

14. The method of claim 12, further comprising:
determining an ownership code based on the binary code;
accessing, from an ownership database, a chain of ownership information associated with the ownership code; and
publishing the chain of ownership information.

15. The method of claim 14, further comprising:
receiving seller information associated with a seller of the garment; and
removing a garment listing associated with the garment when the chain of ownership information does not match the seller information.

16. The method of claim 12, further comprising:
removing a garment listing associated with the garment when the confidence score is below the predetermined threshold score.

17. A non-transitory computer-readable medium storing instructions that, when executed by one or more computer processors of a computing device, cause the computing device to perform operations comprising:
receiving an image of a garment, the image including a section of the garment that includes an asymmetrical pattern being woven in the garment, the asymmetrical pattern created by at least a first weft thread woven through a set of warp threads;
for each warp thread in the set of warp threads, determining a binary digit based on whether the first weft thread is woven over or under the respective warp thread, yielding a binary code;
comparing the binary code to a set of authentication codes stored in an authentication database, yielding a comparison, the authentication codes being associated with authentic garments;
identifying, based on the comparison, a first authentication code;
calculating a confidence score based on a percentage of binary digits in the binary code that match corresponding binary digits of the first authentication code; and
in response to determining that the confidence score meets or exceeds a predetermined threshold score, causing a verification that the garment is authentic to be presented on a display of a device.

18. The non-transitory computer-readable medium of claim 17, the operations further comprising:
publishing a garment listing associated with the garment based on the verification that the garment is authentic.

19. The non-transitory computer-readable medium of claim 17, the operations further comprising:
   determining an ownership code based on the binary code;
   accessing, from an ownership database, a chain of ownership information associated with the ownership code; and
   publishing the chain of ownership information.

20. The non-transitory computer-readable medium of claim 19, the operations further comprising:
   receiving seller information associated with a seller of the garment; and
   removing a garment listing associated with the garment when the chain of ownership information does not match the seller information.

* * * * *

UNITED STATES PATENT AND TRADEMARK OFFICE
CERTIFICATE OF CORRECTION

PATENT NO. : 9,984,261 B2
APPLICATION NO. : 15/285151
DATED : May 29, 2018
INVENTOR(S) : Sergio Pinzon Gonzales, Jr.

Page 1 of 1

It is certified that error appears in the above-identified patent and that said Letters Patent is hereby corrected as shown below:

On the Title Page

Column 1, under (*) Notice, Line 3, after "0 days." delete "days.".

In the Claims

In Column 20, Line 55, in Claim 1, after "in" insert -- an --.

In Column 21, Lines 31-32, in Claim 7, delete "code weft and warp information;" and insert -- code; --, therefor.

In Column 21, Lines 45-46, in Claim 8, delete "area based on the verification." and insert -- area. --, therefor.

Signed and Sealed this
Twenty-third Day of October, 2018

Andrei Iancu
*Director of the United States Patent and Trademark Office*